United States Patent
Kershaw

Patent Number: 6,069,558
Date of Patent: May 30, 2000

[54] WARNING SYSTEM FOR VEHICLES OPERATING IN CONFINED SPACES

[76] Inventor: Denis Kershaw, 9 Hezlett Road, Kellyville NSW 2155, Australia

[21] Appl. No.: 09/204,773

[22] Filed: Dec. 3, 1998

[30] Foreign Application Priority Data

Dec. 22, 1997 [AU] Australia ............................ PP1064/97

[51] Int. Cl.[7] .................................................. B60Q 1/00
[52] U.S. Cl. ......................... 340/435; 340/436; 340/942; 250/491.1
[58] Field of Search .................................. 340/435, 436, 340/942; 250/491.1

[56] References Cited

U.S. PATENT DOCUMENTS

| | | | |
|---|---|---|---|
| 4,808,997 | 2/1989 | Barkley et al. | 340/942 |
| 4,916,429 | 4/1990 | Hicks et al. | 340/436 |
| 5,389,912 | 2/1995 | Arvin | 340/435 |
| 5,828,320 | 10/1998 | Buck | 340/942 |

*Primary Examiner*—Edward Lefkowitz
*Attorney, Agent, or Firm*—Cohen, Pontani, Lieberman & Pavane

[57] ABSTRACT

A system for reducing the collision rate between vehicles and obstacles in confined areas comprising a photoelectric emitter on the vehicle adapted to project light substantially vertically from the vehicle; one or more substantially downwardly facing reflectors strategically placed above the vehicle approach path to obstacles in the confined area comprising the working environment for the vehicle such that the projected light will be reflected back to the vehicle in the event that the vehicle approaches an obstacle; a photoelectric sensor on the vehicle adapted to sense the presence of the light projected from the emitter on the vehicle and reflected back to the vehicle by a reflector; an alarm or other device responsive to the sensing of the reflected photoelectric beam adapted to warn the operator or alter the control settings of the vehicle so as to minimize the likelihood of the vehicle colliding with an obstacle.

13 Claims, 1 Drawing Sheet

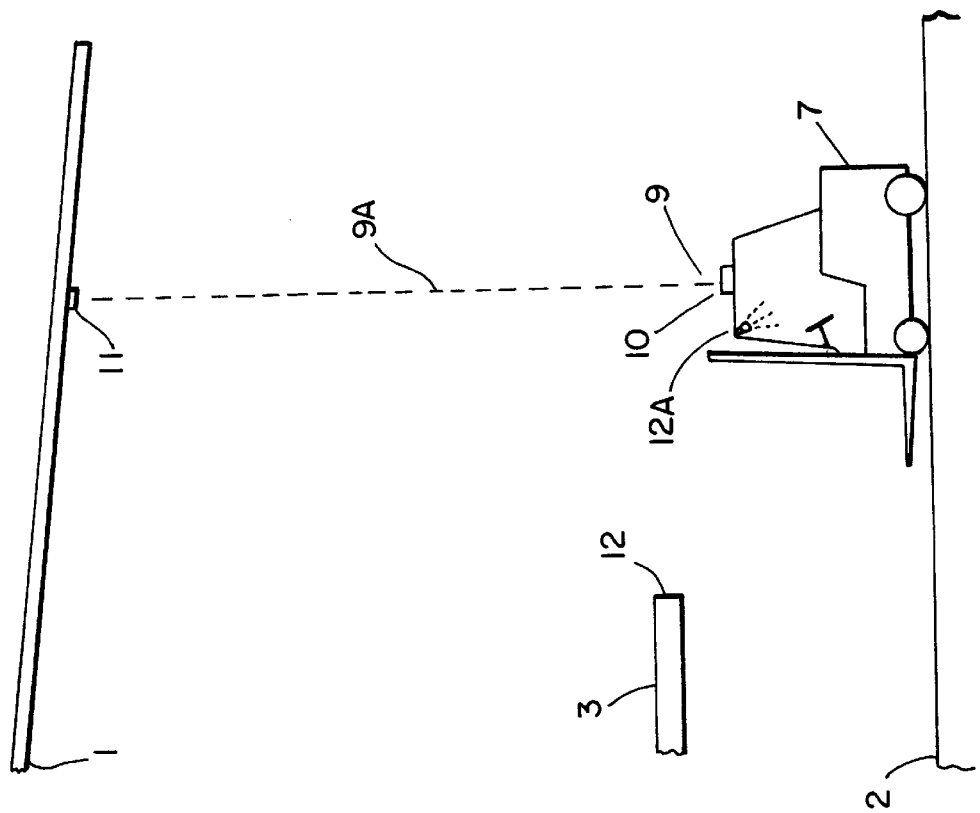
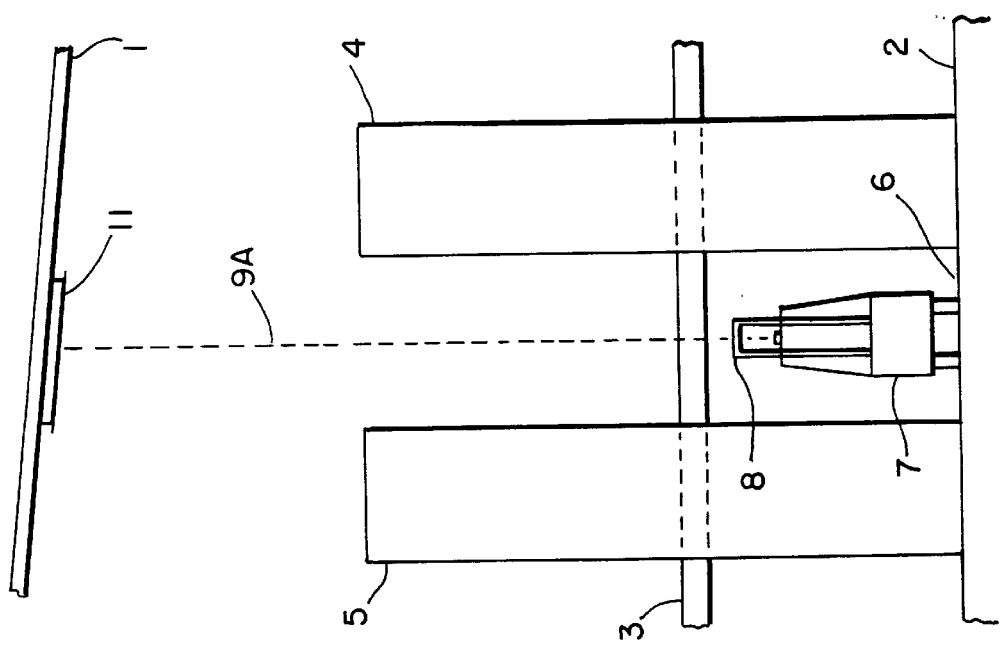

WARNING SYSTEM FOR VEHICLES OPERATING IN CONFINED SPACES

The present invention relates to a warning system for use in conjunction with vehicles operating in confined spaces and has particularly useful application to forklift trucks operating in warehouse or other storage environments.

For many years forklift trucks have been utilised to move goods and services in and out of warehouse environments as well as for movement of goods from one place within a warehouse environment to another. In order that these warehouses or storage facilities may hold as much product as possible the areas provided for passage and operation of forklift trucks and other product carrying vehicles within the storage environment are necessarily fairly confined. In production environments there are often conveyors, mezzanine levels, conduits and other height obstructing obstacles which prevent passage of a forklift unless the mast is in the lowered position. Unfortunately when a forklift is carrying a load the driver's forward vision is often impaired and such overhead obstacles may often not be visible until a collision takes place. Such collisions are dangerous and furthermore cause expensive damage to forklifts, conveyors and other overhead equipment involved in such a collision.

Even in single storey environments such as local fruit shop stores forklifts collide with doorways due to operators failing to lower forklift masts before negotiating doorways. Forklift vehicles often have extensive lifting capabilities which can result in the mast being raised to a height of six to eleven meters above the ground and it will be appreciated that such an extended mast comprises a considerable hazard in the confines of a storage facility.

Accordingly it is an object of the present invention to alleviate damage that occurs in warehouses, storage areas, loading docks, factories and the like as a result of the passage of forklift and other vehicles which do not have sufficient clearance from overhead structures; alternatively it is an object of the present invention to at least provide the market with an alternative to existing systems for preventing collisions between vehicles and other objects in confined areas.

According to the present invention there is disclosed a system for reducing the collision rate between vehicles and obstacles in confined areas comprising a photoelectric emitter on the vehicle adapted to project light substantially vertically from the vehicle; one or more substantially downwardly facing reflectors strategically placed above the vehicle approach path to obstacles in the confined area comprising the working environment for the vehicle such that the projected light will be reflected back to the vehicle in the event that the vehicle approaches an obstacle; a photoelectric sensor on the vehicle adapted to sense the presence of the light projected from the emitter on the vehicle and reflected back to the vehicle by a reflector; alarm means responsive to the sensing of the reflected photoelectric beam adapted to warn the operator or alter the control settings of the vehicle so as to minimise the likelihood of the vehicle colliding with an obstacle.

One embodiment of the present invention will now be described with reference to the accompanying drawings in which:

FIG. 1 is a sectional end elevation through a factory storage facility; and

FIG. 2 is a sectional side elevation through the factory storage facility of FIG. 1.

According to the system depicted with reference to FIGS. 1 and 2 hereof there is disclosed part of a factory storage facility having a ceiling 1, a floor 2, an overhead conveyor 3 and longitudinally disposed rows 4 and 5 of shelving having aisles 6 therebetween to facilitate passage of forklift vehicles 7.

It will be appreciated that the shelving extends significantly above the maximum height 8 of the lowered mast of the forklift vehicle but that extension of the mast of the forklift vehicle to its maximum extension (not shown) is necessary to facilitate removal and replacement of product from the upper levels of rows 4 and 5 of shelving. It will further be appreciated that unless the forklift vehicle 7 has its mast in the lowered position it will not be able to pass under conveyor 3 and that conveyor 3 will therefore present a serious obstacle to passage of the forklift if the forklift mast is at anything other than the lowered position depicted in FIGS. 1 and 2.

In order to prevent a collision between the mast 8 of the forklift vehicle 7 and overhead conveyor 3 the forklift vehicle is provided with a laser beam projection unit 9 which also incorporates a sensor 10 adapted to sense the presence of a reflected laser beam of the frequency being transmitted by the laser beam projection unit 9.

It will be observed that a laser reflecting surface 11 is placed on the underside of ceiling 1 at a short distance on the approach to extremity 12 of conveyor 3 above aisle 6 in order that forklift vehicle 7 approaching extremity 12 of conveyor 3 with laser beam projection unit 9 projecting a laser beam 9a substantially vertically would cause sensor 10 to receive reflected laser light back from reflecting surface 11. Sensor 10 would then activate an audible alarm emitted from sound generating device 12a conditional upon a further sensor (not shown) indicating that the mast was in anything other than the lowered position depicted in FIGS. 1 and 2.

It will be appreciated that the sensing of the reflected laser beam by sensor 10 may be used to trigger different types of alarm conditions and for example the sensing of the reflected laser beam may be used to trigger visible alarms either in addition to or instead of audible alarms and it may be used to automatically reduce the speed of the forklift a vehicle or indeed take other appropriate actions in relation to the forklift vehicle in order to prevent a collision with overhead conveyor 3. The alarm condition may also be conditional upon vehicle states such as mast height, speed or load height.

Typically a forklift vehicle may travel at approximately fifteen kilometers per hour which equates to 4.166 millimeters/ms. Typical laser sensing units 10 require incidence of a reflected laser beam for two milliseconds or more to ensure reception and consequently if reflective tapes of approximately fifty millimeters in width are utilised it is desirable that two laser transmitters are utilised each displaced by less than the width of the tape (preferably three-quarters of the width of the tape). In this way both laser beams will have to traverse the width of the tape in the event that the lasers are projected substantially vertically from a vehicle passing beneath the reflected tape and hence the laser sensing source 10 will receive a signal of reflected laser light for two milliseconds or more when the forklift vehicle is proceeding at its maximum rate of progress of fifteen kilometers per hour or more.

Alternatively larger reflectors can be utilised although this increases the cost considerably in the situation of large storage facilities where some hundreds of overhead reflectors must be positioned adjacent all approaches to overhead obstacles. One appropriate reflective tape for use in conjunction with the present invention is "Banner" branded fifty millimeter wide reflective tape incorporating many corner prism reflectors per square centimeter and sold by Micromax of Sydney Australia.

Although polarised light may be utilised in order to reduce false alarms occasioned by laser beams reflecting from surfaces other than the intended reflectors it is envisaged that non-polarised sensors may be utilised in order to increase the range of the system.

It is further envisaged that it would be advantageous to use visible lasers in order to facilitate easy placement of reflectors by trial and error.

Provision for monitoring the operation of the light source sender receiver can be achieved by the addition to the vehicle of secondary polarised infra-red sideways looking sensors which would be triggered by reflectors placed in a horizontal relationship to the vehicle to coincide with the overhead reflectors. These would have the effect of checking that a satisfactory operation of the vertical projected sensor has occurred. These monitoring points could be few and placed at entry and exit passages to work areas. Failure of the vehicle to react to the summation of the check sensors and the vertical projected sensor signals would initiate a further appropriate fault indication alarm.

It will be appreciated that in theory other light sources other than lasers, for example infra-red sources, could be utilised although it has been found that with some lensing arrangements such light sources spread too much over the distances involved thereby giving an inaccurate indication of placement of the vehicle.

Although it is not essential that the projection of the laser beam from the vehicle be absolutely vertical it is desirable that the beam be projected at a constant relationship to vertical such, for example, as within twenty-five degrees of vertical or within five degrees of vertical by a self-compensating single plane mounting. This would allow for the changing level of the vehicle front to back which would occur when loaded and unloaded and as a result of various tire conditions providing a more accurate indication of the placement of the vehicle and an appropriate alarm whether the vehicle is operating in forward to reverse.

The claims defining the invention are as follows:

1. A system for reducing the collision rate between vehicles and obstacles in confined areas comprising a photoelectric emitter on the vehicle adapted to project light substantially vertically from the vehicle; at least one substantially downwardly facing reflector strategically placed above the vehicle approach path to obstacles in the confined area comprising the working environment for the vehicle such that the projected light will be reflected back to the vehicle by the at least one substantially downwardly facing reflector in the event that the vehicle approaches an obstacle; a photoelectric sensor on the vehicle adapted to sense the presence of the light projected from the emitter on the vehicle and reflected back to the vehicle by the at least one substantially downwardly facing reflector; alarm means responsive to the sensing of the reflected photoelectric beam adapted to warn the operator or alter the control settings of the vehicle so as to minimise the likelihood of the vehicle colliding with an obstacle.

2. A system in accordance with claim 1 hereof wherein the vehicle is a forklift truck.

3. A system in accordance with claim 1 hereof wherein the light is projected at an angle within twenty-five degrees of vertical.

4. A system in accordance with claim 1 hereof wherein the light is projected at an angle within five degrees of vertical.

5. A system in accordance with claim 1 hereof wherein a visible light beam is utilised.

6. A system in accordance with claim 1 hereof wherein the size of the at least one substantially downwardly facing reflector is calculated by reference to the maximum speed of the vehicle and the responsiveness of the photoelectric sensor in order that when the vehicle is progressing at its maximum speed the sensor will receive a reflected light signal from the emitter for a time period adequate to ensure that the sensor will recognise the reflected signal and trigger an alarm condition.

7. A system in accordance with claim 1 hereof wherein the at least one substantially downwardly facing reflector dimension along the axis intended to be traversed by the light projected by the emitter on the vehicle is less than seventy-seven millimeters.

8. A system in accordance with claim 1 hereof wherein the vehicle is provided with multiple photoelectric emitters in order to lengthen the duration of incident projected light on the sensor in order to ensure the triggering of an alarm condition without having to provide a reflector of excessive size.

9. A system in accordance with claim 1 hereof wherein the at least one substantially downwardly facing reflector is of that type utilising large numbers of corner cube reflectors per square centimeter.

10. A system in accordance with claim 1 hereof wherein the photoelectric emitter on the vehicle is provided with means to ensure that the light is projected at a constant angle to the vertical irrespective of the loading or inclination of the vehicle.

11. A system in accordance with claim 1 hereof wherein the photoelectric emitter projects laser light.

12. A system in accordance with claim 1 hereof wherein the photoelectric emitter projects infra-red light.

13. The system of claim 1, wherein the at least one substantially downwardly facing reflector comprises a plurality of substantially downwardly facing reflectors respectively placed above a plurality of vehicle approach paths to obstacles in the confined area, and wherein the projected light will be reflected back to the vehicle by any one of the plural substantially downwardly facing reflectors in the event that the vehicle approaches an obstacle that the any one of the plural substantially downwardly facing reflectors is strategically placed above.

* * * * *